May 1, 1956 F. COLLURA 2,744,203
BLENDER MOTOR SUPPORT
Filed Aug. 31, 1953 2 Sheets-Sheet 2
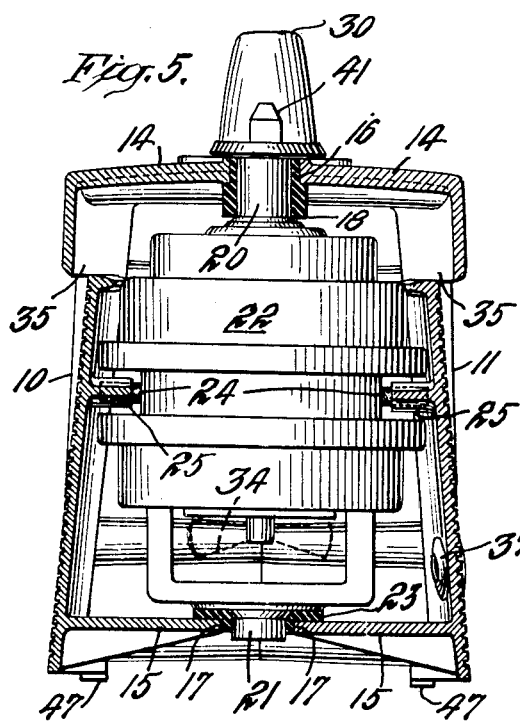
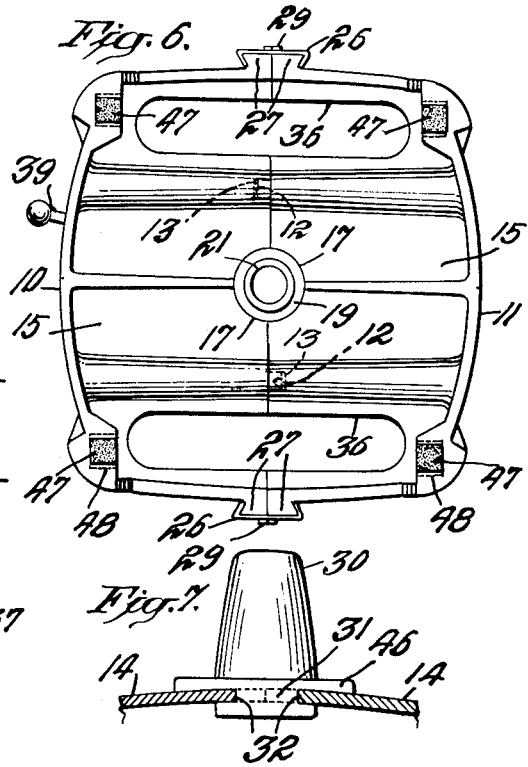
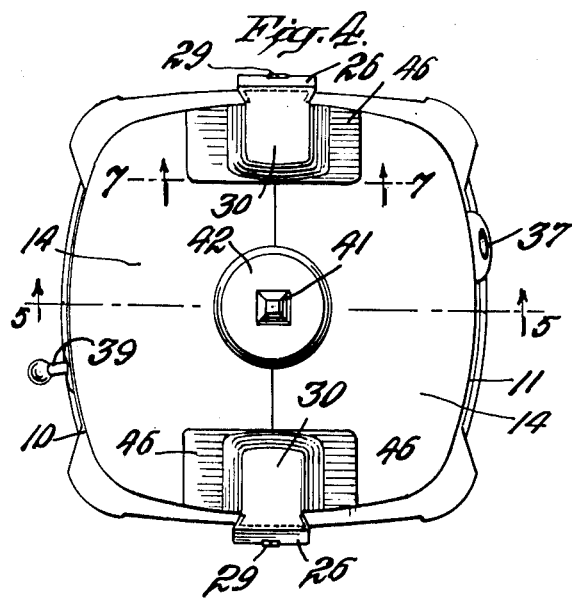
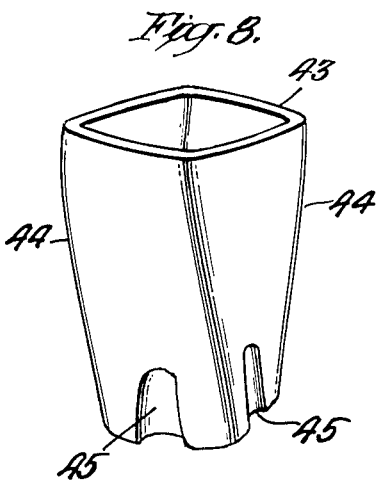
INVENTOR.
FRANCESCO COLLURA
BY
ATTORNEY

United States Patent Office 2,744,203
Patented May 1, 1956

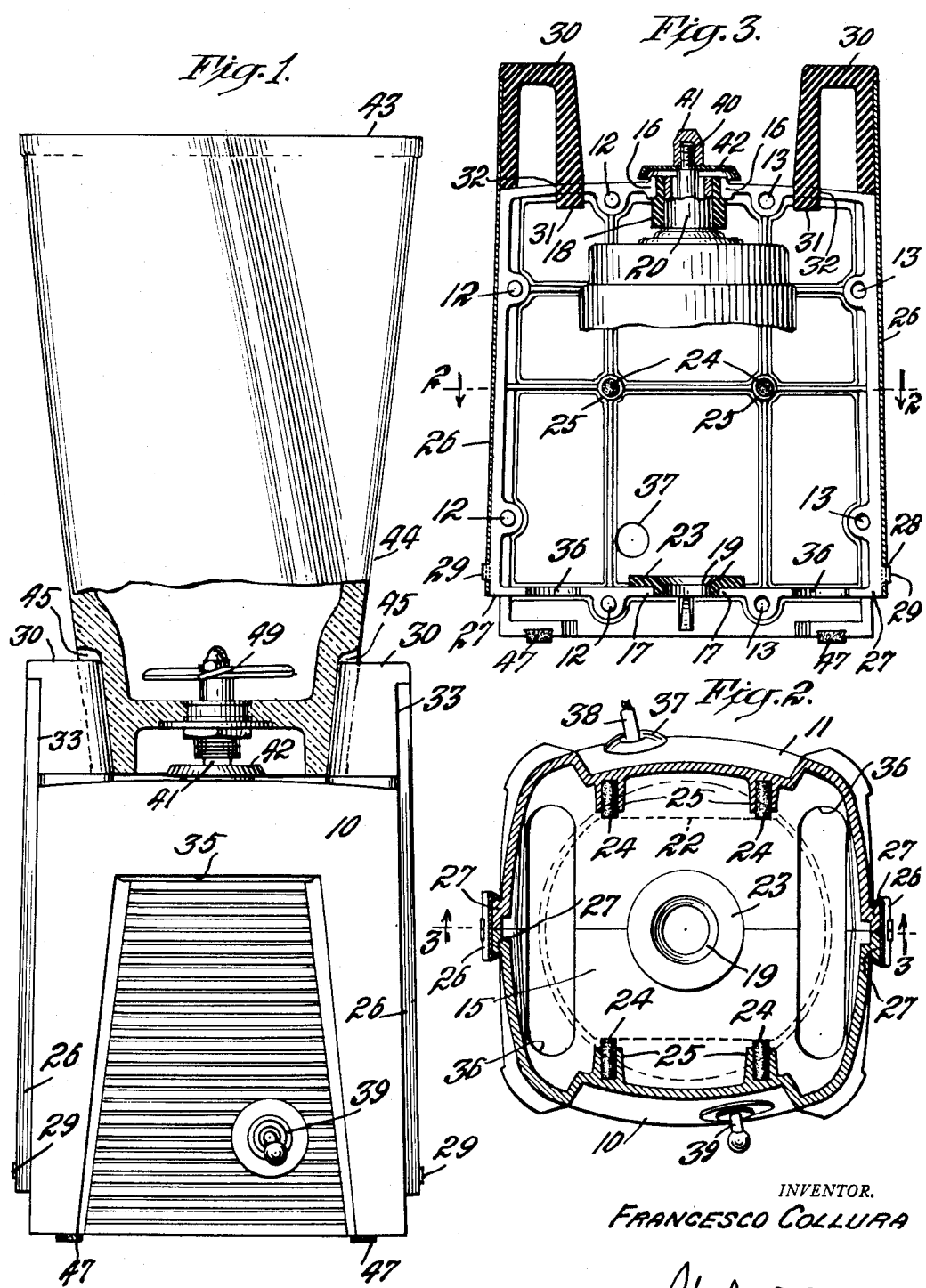

2,744,203

BLENDER MOTOR SUPPORT

Francesco Collura, New York, N. Y.

Application August 31, 1953, Serial No. 377,342

6 Claims. (Cl. 310—91)

The invention herein disclosed relates to electric blenders or mixers.

Objects of the invention are to improve the construction of such machines, particularly in the assembly of the base or housing, the mounting and cushioning of the motor in the housing, the elimination of bolts and screws and small parts, the facility of assembly of the parts and the accomplishment of quiet, vibrationless operation.

Further special objects are to attain faster and more complete blending action.

Other special objects are to reduce the number of necessary parts and the cost of parts and assembly operations.

Other desirable objects and the novel features of construction, combination and relation of parts through which the purposes of the invention are attained are set forth and will appear in the course of the following specification.

The drawings accompanying and forming part of the specification illustrate a present practical embodiment of the invention. Structure, however, may be modified and changed as regards the immediate illustration, all within the true intent and scope of the invention as hereinafter defined and claimed.

Fig. 1 in the drawings is a front elevation of one of the new blenders with the base of the jar shown broken away and in section;

Fig. 2 is a horizontal sectional view on substantially the plane of line 2—2 of Fig. 1;

Fig. 3 is a broken vertical sectional view taken on the meeting plane of the two housing sections, a plane as represented by line 3—3 of Fig. 2;

Fig. 4 is a top plan view of the machine;

Fig. 5 is a vertical sectional view across the two halves of the housing, on substantially the plane of line 5—5 of Fig. 4;

Fig. 6 is a bottom plan view of the machine;

Fig. 7 is a broken sectional detail showing how the jar holding pads are secured between the meeting halves of the base;

Fig. 8 is a perspective view of the blending jar illustrating the twisted formation of the same.

A special feature of the present invention is that the motor housing or base of the machine is made in duplicate half sections meeting on a vertical plane, and the motor is supported at top and bottom on vibration damping cushions disposed between these sections.

In the several views the duplicate housing sections or halves are designated 10, 11 and they are shown each as having pins 12 at one side and corresponding openings 13 at the opposite side of their meeting edges, Fig. 3, so that they will automatically register and hold in alignment when put together.

The top and bottom walls 14, 15 of the housing sections are shown formed with centrally located, substantially semicircular cavities 16, 17 mating to provide sockets for holding the circular cushions 18, 19 which are engaged over the upper and lower mounting hubs 20, 21, respectively, of the housing or stator frame of the motor 22.

These motor cushioning elements may be in the form of soft rubber sleeves shouldered to fit the mounting cavities in the sections, and the lower one flanged at 23 to afford proper support for the motor.

This cushion mounting leaves the motor frame freedom to turn about its rotational axis to eliminate and avoid instantaneous starting loads or shocks and the extent of such cushioning is limited in the illustration by elastic plugs 24 set into sockets 25, Fig. 2, in the casing sections, in position to engage opposite sides of the motor.

With this construction the motor may be assembled in the housing by simply engaging the cushioning sleeves 18, 19 over the upper and lower mounting hubs of the motor and inserting the torque and vibration damping plugs 24 in the sockets provided in the halves of the housing, after which the motor may be located in one half and the other half applied over the same, the pins 12 on the edge of one mating corresponding openings in the edge of the other section.

The two sections are shown secured together by channel strips 26 slidingly engaged over dovetail ribs 27 provided along the meeting edges of the sections.

These channel strips are shown removably secured in place by having openings 28 in the lower ends of the same to snap over locking lugs 29 on the ribs.

These securing channels have a further function in the illustration, of bracing and positioning the jar holding pads 30 which are shown in Figs. 3 and 4 as seating on top of the casing sections and having dependent portions 31 held in recesses 32 in the meeting edges of the sections, the outer edges of these pads being dovetail grooved at 33 to receive the upper end portions of the strips.

Cooling of the motor is effected in the illustration by provision of a fan 34 on the upper or lower end of the motor shaft, designed to draw in air through ports 35, Fig. 5, near the upper ends of the housing sections and to pass this air downwardly through and around the motor, out relief passages 36, Fig. 3, in the bottom of the housing sections.

Similar openings 37 are shown formed in the housing sections, one to serve as an opening for the electric cord 38, Fig. 2, and the other to serve as a mounting for the electric switch 39.

The construction described enables the motor to drive the cutter or propeller direct, without need for a special flexible coupling or other such device.

The upper end of the motor shaft may therefore be screw threaded as indicated at 40, Fig. 3, to take the driver head 41, and the slinger 42 may be secured over the shouldered end portion of the shaft by the driver head.

The jar 43 is shown in Fig. 8 as of special design, having substantially square upper and lower ends but twisted out of alignment about a quarter of a turn to provide, with the downward taper of the jar, helico-spiral corners 44 producing vortices for expediting and accelerating the blending action.

At the base the jar is shown as having grooves 45 in all four sides to match the oppositely disposed holding pads 30, and the latter are shown in Figs. 1, 4, and 7 as having horizontal extensions 46 to firmly seat the flat bottom of the jar.

Cushion pads 47 are shown set in sockets 48 provided in the corner portions of the housing sections.

The hollow base sections may be molded in plastic, affording a desirable finish and ornamental appearance.

Structural parts are relatively few and inexpensive and assembly is simple and effective. The motor is cushioned against vibration and protected against shock and strain.

The cushioned mounting of the motor and resilient positioning of the jar assures proper alignment of the driver head 41 and the cutter 49 journaled in the bottom the jar.

The securing of all parts by the two sliding channel strips eliminates need for fastening screws, bolts or the like and assures quick and easy assembly and disassembly.

The twist given the jar shape preferably is the reverse of the motor rotation so as to oppose rotation imparted to the contents by the cutter blades, thus to permit more effective mixing and blending action. The material being blended is caused to strike the jar edges with greater velocity and to create more violent vortices along each edge. The resultant higher speed vortex action causes the contents to travel through its entire mixing cycle more rapidly, resulting in faster and more complete blending.

In addition to the ventilating inlets in the upper sides and outlets in the bottom of the housing, baffles may be provided on the inner walls of the housing sections to direct and promote proper ventilating and cooling flow of air.

The cushioned mounting of the motor and the rigid coupling of the motor shaft to the cutter serves to accomplish automatic alignment of the motor and jar, thus avoiding eccentric loading and bearing wear, eliminating vibration and assuring quiet operation.

The square cross section of the jar and the constant upward twist brings the inner corners of the jar, because of the incline, downward closer to the leading edges of the cutter blades, to promote the mixing and blending action. It is possible, however, that the twist of the jar may be in the same direction as the cutter rotation, in which case a different blending action would result and which for certain materials might be preferred.

The twisted formation of the jar has other advantages, such as affording a better and more effective hand grip and a more attractive ornamental appearance.

What is claimed is:

1. A blender of the character disclosed comprising a hollow base composed of upright complementary sections having top and bottom walls with recesses registering to provide openings through the top and bottom walls, a motor having a stator frame with mounting hubs at opposite ends of the same adapted for disposition in said openings, motor mounting cushions disposed in said openings about said mounting hubs and arranged to support the motor with freedom for rotational vibration of the stator, torque resisting cushioning means interposed between the motor and housing sections for damping and yieldingly limiting the extent of said rotational vibration of the stator in the base, a motor shaft extending upwardly through the upper mounting hub, a driver head on the upper end of said motor shaft and means for removably securing the complementary base sections together in the motor supporting and damping relation described.

2. A blender of the character disclosed comprising a hollow base composed of upright complementary sections having top and bottom walls with recesses registering to provide openings through the top and bottom walls, a motor having a stator frame with mounting hubs at opposite ends of the same adapted for disposition in said openings, motor mounting cushions disposed in said openings about said mounting hubs and arranged to support the motor with freedom for rotational vibration of the stator, torque resisting cushioning means interposed between the motor and housing sections for damping and yieldingly limiting the extent of said rotational vibration of the stator in the base, a motor shaft extending upwardly through the upper mounting hub, a driver head on the upper end of said motor shaft and means for removably securing the complementary base sections together in the motor supporting and damping relation described, including channel strips, the base sections having ribs along their meeting edges engageable in said channel strips and means for releasably retaining said channel strips in base section securing relation.

3. A blender of the character disclosed comprising a hollow base composed of upright complementary sections having top and bottom walls with recesses registering to provide openings through the top and bottom walls, a motor having a stator frame with mounting hubs at opposite ends of the same adapted for disposition in said openings, motor mounting cushions disposed in said openings about said mounting hubs and arranged to support the motor with freedom for rotational vibration of the stator, torque resisting cushioning means interposed between the motor and housing sections for damping and yieldingly limiting the extent of said rotational vibration of the stator in the base, a motor shaft extending upwardly through the upper mounting hub, a driver head on the upper end of said motor shaft and means for removably securing the complementary base sections together in the motor supporting and damping relation described, said base sections having air inlets in the sides near the top of the same and air outlets at the bottom of the same.

4. A blender of the character disclosed comprising a hollow base composed of upright complementary sections having top and bottom walls with recesses registering to provide openings through the top and bottom walls, a motor having a stator frame with mounting hubs at opposite ends of the same adapted for disposition in said openings, motor mounting cushions disposed in said openings about said mounting hubs and arranged to support the motor with freedom for rotational vibration of the stator, torque resisting cushioning means interposed between the motor and housing sections for damping and yieldingly limiting the extent of said rotational vibration of the stator in the base, a motor shaft extending upwardly through the upper mounting hub, a driver head on the upper end of said motor shaft and means for removably securing the complementary base sections together in the motor supporting and damping relation described, and jar holding pads on top of the base sections at opposite sides of the driver head, the top wall of the base sections having registering recesses near the outer edges of the base and said pads having dependent portions gripped in said registering recesses and common means for securing the base sections together and for securing said pads on top of the assembled base sections.

5. A blender of the character disclosed comprising a hollow base composed of upright complementary sections having top and bottom walls with recesses registering to provide openings through the top and bottom walls, a motor having a stator frame with mounting hubs at opposite ends of the same adapted for disposition in said openings, motor mounting cushions disposed in said openings about said mounting hubs and arranged to support the motor with freedom for rotational vibration of the stator, torque resisting cushioning means interposed between the motor and housing sections for damping and yieldingly limiting the extent of said rotational vibration of the stator in the base, a motor shaft extending upwardly through the upper mounting hub, a driver head on the upper end of said motor shaft and means for removably securing the complementary base sections together in the motor supporting and damping relation described, and jar holding pads on top of the base sections at opposite sides of the driver head, the top wall of the base sections having registering recesses near the outer edges of the base and said pads having dependent portions gripped in said registering recesses and said means for securing the base sections together including securing strips engaged over the outer portions of said jar holding pads.

6. A blender of the character disclosed comprising a hollow base composed of upright complementary sections having top and bottom walls with recesses registering to provide openings through the top and bottom walls, a motor having a stator frame with mounting hubs at opposite ends of the same adapted for disposition in said openings, motor mounting cushions disposed in said openings about said mounting hubs and arranged to support the motor with freedom for rotational vibration of the stator, torque resisting cushioning means interposed between the motor and housing sections for damping and yieldingly limiting the extent of said rotational vibration of the stator in the base, a motor shaft extending upwardly through the upper mounting hub, a driver head on the upper end of said motor shaft and means for removably securing the complementary base sections together in the motor supporting and damping relation described, jar holding pads on the top of the base at opposite sides of the driver head, said means for securing the base sections together extending above the top of the base and connected with said jar holding pads for locating and supporting said pads on top of the base.

References Cited in the file of this patent

UNITED STATES PATENTS

| Number | Name | Date |
|---|---|---|
| 216,227 | Sedgwick | June 3, 1879 |
| 1,033,744 | Smith | July 23, 1912 |
| 2,109,501 | Osius | Mar. 1, 1938 |
| 2,304,476 | Poplawski | Dec. 8, 1942 |
| 2,471,812 | Christiano | May 31, 1949 |